United States Patent
Dooley et al.

(10) Patent No.: US 7,492,744 B2
(45) Date of Patent: Feb. 17, 2009

(54) METHOD AND SYSTEM FOR MULTIPLE BASIC AND EXTENDED SERVICE SET IDENTIFIERS IN WIRELESS LOCAL AREA NETWORKS

(75) Inventors: John Dooley, San Jose, CA (US); Alona Gian, San Mateo, CA (US); John Klein, El Dorado Hills, CA (US); Marc Mulders, San Carlos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 579 days.

(21) Appl. No.: 10/838,703

(22) Filed: May 4, 2004

(65) Prior Publication Data

US 2005/0180367 A1    Aug. 18, 2005

Related U.S. Application Data

(63) Continuation-in-part of application No. 10/773,931, filed on Feb. 6, 2004, now Pat. No. 7,280,520.

(51) Int. Cl.
*H04Q 7/20* (2006.01)

(52) U.S. Cl. .................. 370/338; 370/328; 370/310; 370/329; 455/426.1; 455/426.2; 455/422.1; 455/445; 455/560

(58) Field of Classification Search .......... 370/338, 370/328, 312, 329, 343; 455/426.1, 426.2, 455/422.1, 403, 414.1, 414.2, 414.3, 414.4, 455/572, 574, 343.1–343.6, 550.1, 450–453, 455/509, 436, 511, 513, 514, 500, 517, 445, 455/560

See application file for complete search history.

(56) References Cited

U.S. PATENT DOCUMENTS

| | | | |
|---|---|---|---|
| 6,618,763 | B1 | 9/2003 | Steinberg |
| 6,658,259 | B2 | 12/2003 | McIntosh |
| 6,950,628 | B1 | 9/2005 | Meier et al. |
| 6,973,052 | B2 | 12/2005 | Wang et al. |
| 2002/0022483 | A1* | 2/2002 | Thompson et al. .......... 455/439 |
| 2004/0037259 | A1 | 2/2004 | Steinberg |
| 2004/0196812 | A1* | 10/2004 | Barber ..................... 370/334 |
| 2004/0198220 | A1* | 10/2004 | Whelan et al. ............ 455/41.1 |
| 2004/0224690 | A1* | 11/2004 | Choi et al. .................. 455/436 |
| 2005/0128988 | A1* | 6/2005 | Simpson et al. ............ 370/338 |

* cited by examiner

*Primary Examiner*—Keith T Ferguson
(74) *Attorney, Agent, or Firm*—Fay Kaplun & Marcin, LLP

(57) ABSTRACT

An improved system and method using multiple basic and extended service set identifiers for a single radio in a wireless local area network is provided. The method includes the use of several basic service set identifiers for at least some access points, associating an extended service set identifier with each virtual local area network, and assigning each of the extended service set identifiers and associated local area network to one basic service set identifier.

8 Claims, 2 Drawing Sheets

METHOD AND SYSTEM FOR MULTIPLE BASIC AND EXTENDED SERVICE SET IDENTIFIERS IN WIRELESS LOCAL AREA NETWORKS

CROSS-REFERENCE TO RELATED APPLICATION

This application is a continuation-in-part of U.S. patent application Ser. No. 10/773,931, filed on Feb. 6, 2004, now U.S. Pat. No. 7,280,520 the entire disclosure of which is incorporated herein by reference.

BACKGROUND OF THE INVENTION

This invention relates to wireless local area networks, such as those following the protocols of IEEE Standard 802.11.

The present invention may be used in conjunction with networks arranged to use wireless switches and access ports, such as the networks described in copending application Ser. No. 09/528,697, filed Mar. 17, 2000, the specification of which is incorporated herein by reference. It should be understood that the term "access port" as used in this application is the commercial name for the device referred to as an "RF Port" in the referenced copending application and the term "wireless switch" as used in this application is the commercial name for the device referred to as "Cell Controller" in the referenced copending application. The wireless switches of the present invention may also correspond to the cell controllers described in co-pending provisional application Ser. No. 60/473,755, filed May 28, 2003, the specification of which is incorporated herein by reference.

The method of the present invention may also be practiced in systems using the Wireless Switch Protocol ("WISP") which is described in the application filed on Apr. 28, 2004, entitled "Protocol for Communications Between Access Ports and Wireless Switches" and owned by the assignee, incorporated herein by reference.

In accordance with the 802.11 standard, a basic service set ("BSS") is a term used to describe a collection of devices which may communicate over a wireless local area network ("WLAN"). The BSS may or may not include an access point or access port which can bridge the wireless network with a fixed wired network such as an Ethernet network, and the set of stations in a BSS is generally controlled by a single coordination function, which determines when a station in the BSS may transmit/receive data.

Also in accordance with the 802.11 standard, identifiers are used to distinguish between BSSs. A basic service set identifier ("BSSID") is used to identify a particular BSS. 802.11 access points as known in the prior art are configured with a single BSSID. The BSSID is generally six octets long, and is generally the same as the MAC address of the radio module in the access point. A BSSID is generally included within all frames transmitted on the wireless network.

An extended service set identifier ("ESSID") is used to identify an extended service set ("ESS"), which is a set of two or more BSSs interconnected by a distribution system. An ESS allows a mobile user to move between BSSs within a single ESS and yet still remain "connected" to the fixed network (and thus can access the same files, receive e-mails, etc.) In accordance with the 802.11 standard, a BSSID may preferably support between 4-16 ESSIDs, or even more in further embodiments.

Mobile units in current wireless local area networks suffer the deficiency of receiving and processing all broadcast and multicast messages on the channel to which they are currently tuned and containing the BSSID to which they are associated—many or all of which may not be intended for the particular mobile unit. In mobile applications, the receipt and processing of such messages can cause unnecessary power consumption which results in depletion of battery life, since mobile units must unnecessarily wake from a sleep mode or other reduced power state in order to process these broadcast messages. Furthermore, during peak network traffic periods, receipt and processing of additional broadcast/multicast messages by each mobile unit in a system may result in additional unnecessary load on mobile unit processors.

Furthermore, application Ser. No. 10/773,931, filed on Feb. 6, 2004, the specification of which is fully incorporated herein by reference, describes a system and method for a virtual local area network. In connection with the network described therein, each wireless virtual local area network ("VLAN") may use a different security scheme (such as WEP, AES, WPA, KeyGuard, Kerberos, and others known to those of ordinary skill in the art). It should be understood that the term "basic service set identifier" as used in this application is the same as the "primary service set identification" of the referenced copending application and the term "extended service set identifier" as used in this application is the same as the "secondary service set identification" of the referenced copending application.

Accordingly, when communicating through a common access point or access port using a common BSSID for the access port and unique ESSID for each VLAN segment of the network, message communications may be encrypted. However, 802.11 data broadcasts may or may not be encrypted depending on the lowest common denominator of security that is used for all broadcast multicast traffic when sharing one BSS across many VLAN segments.

Accordingly, it is an object of the invention to provide an improved wireless local area network system and method.

SUMMARY OF THE INVENTION

In accordance with the invention there is provided a method for operating a wireless local area network including assigning a plurality of basic service set identifiers to at least one access point.

Also in accordance with the invention there is provided a method for operating a wireless local area network having access points to provide communications with a plurality of virtual local area networks. A plurality of basic service set identifiers are assigned to at least some access points. An extended service set identifier is mapped to each virtual local area network. Each of the extended service set identifiers and associated virtual local area network are assigned to one of the basic service set identifiers, the assignment being arranged to provide a single extended service set identifier for at least some of the basic service set identifiers.

In a preferred arrangement the wireless local area network includes security arrangements, the security arrangements being associated with at least one of the virtual local area networks and associated extended service set identifier. Communications using basic service set identifiers having a single extended service set identifier use security arrangements associated with the extended service set identifier. At least some access points may be assigned four or more basic service set identifiers, wherein no more than one extended service set identifier is assigned to three of the basic service set identifiers and wherein any additional extended service set identifiers are assigned to the remaining basic service set identifiers.

Also in accordance with the present invention, a method for operating a wireless local area network is provided, including the steps of assigning a plurality of basic service set identifiers to at least one access point, associating one of the plurality of basic service set identifiers with a mobile unit, operating the mobile unit in a power-save mode, and waking the mobile unit from power-save mode when the mobile unit receives a message which includes the assigned basic service set identifier.

DESCRIPTION OF THE INVENTION

Figure 1:
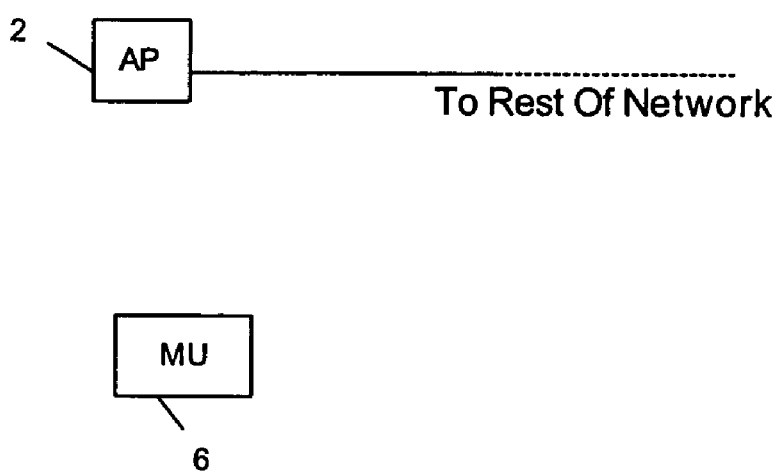
FIG. 1 is a block diagram of a wireless local area network in accordance with the present invention.

Referring to FIG. 1, an exemplary embodiment of a wireless local area network in accordance with the present invention is shown. Access point ("AP") 2 provides radio packet data communications with the mobile units 4, 6 using a communications protocol, such as IEEE standard 802.11, whereby the radio modules in the mobile units 4, 6 monitor polling signals from the AP 2 and associate with AP 2 for data communications. Throughout this application, the term "access point" is defined as referring also to "access ports" as defined within the prior applications incorporated herein by reference. The radio modules of the mobile units and access points may, for example, be identical to those used in the "Spectrum 24" system made by the assignee. Mobile units 2, 4 may further include a processor, memory, and other apparatus as would be known to one of ordinary skill in the art.

The AP 2 may be connected to a Rest of Network ("RON") which may include a server computer, other access points, a distribution system, or any other data communications network configuration.

In accordance with the present invention, AP 2 may be configured to have multiple BSSIDs. The number of allowable BSSIDs for AP 2 may depend on the network performance requirements and other application requirements—in accordance with this exemplary embodiment of the present invention, the maximum number of BSSIDs may preferably be set to 4 (in other embodiments, up to 8 BSSIDs or more may be utilized in a single access point or access port). In this exemplary embodiment, AP 2 may be assigned 4 different BSSIDs, as follows: BSSID_1, BSSID_2, BSSID_3, and BSSID_4.

Thus, mobile unit 4 may be configured to process messages originating only from, for example, BSSID_1, and mobile unit 6 may be configured to process messages originating only from, for example, BSSID_2.

In a next exemplary embodiment as implemented in a warehouse setting, warehouse floor workers may utilize mobile units 4 and 6. In this context, mobile units 4 and 6 may preferably be handheld terminals including at least processor, mobile unit radio, screen, input means, and battery. Mobile units 4 and 6 may be configured to enter into a power-save mode or sleep mode during periods of inactivity. The 802.11 specification, for example, provides a power management scheme which utilizes a power-save mode, which may be utilized in accordance with the present invention.

While in power-save mode, the radios of the mobile units 4 and 6 may still be operating and receiving network transmissions, but the remainder of mobile units (e.g., display, processor, etc.) are preferably in a low-power or no-power consumption mode. When a broadcast/multicast message is transmitted over the wireless network with BSSID=BSSID_2, mobile unit 6 will receive the message and recognize that mobile unit 6 is the intended recipient. In response, mobile unit 6 will preferably wake into a fully operational mode to process the message. However, the radio module of mobile unit 4 will not recognize the BSSID, and will accordingly filter the broadcast/multicast message and remain in the power-save or sleep mode—such messages will never be forwarded to the main mobile unit host processor.

Conversely, if a broadcast/multicast message is transmitted with BSSID=BSSID_1, the radio module of mobile unit 6 would filter the broadcast, while mobile unit 4 would receive and wake from its sleep mode to process the message.

In this way, power consumption may be minimized and battery life maximized by extending power-save/sleep mode periods. This can be a critical point, for example, in application which utilizes a shared infrastructure with mobile terminals which rely on battery power, or any other application which utilizes handheld portable terminals which rely on battery power. Workflow may be disrupted if a worker on a factory floor is required to swap or recharge the battery in the worker's handheld device at regular intervals during a given workshift. The present invention provides benefits in power consumption which may accordingly translate into increased productivity. Furthermore, the batteries themselves may experience a longer useful life, since the batteries will be subjected to less charge cycles in accordance with the present invention.

Additionally, the overall performance of the handheld units may be increased, since the units need not process broadcast/multicast messages which are not intended for the particular handheld unit. Accordingly, less costly processing hardware may be used in the handheld units, since the processing load may be reduced in accordance with this aspect of the present invention.

Furthermore, in some applications which have stringent bandwidth requirements or in which real-time communications are critical, the system and method of the present invention may be particularly beneficial. For example, in applications such as Voice-over-IP ("VoIP") applications, satisfactory performance may be difficult to obtain in a shared infrastructure wireless network. However, in accordance with the present invention, the VoIP applications may be separated from other network applications in accordance with the present invention, and satisfactory performance may be thereby achieved.

In a next exemplary embodiment, a system and method according to the present invention may be implemented in a retail establishment which provides a wireless network utilizing a shared infrastructure. A retail establishment may utilize a wireless network and handheld mobile terminal 4 for use in inventory control. Concurrently, the retail establishment may provide wireless network capability to customers of some portion of the retail establishment—in such instance, a customer may access the wireless network using, for example, a laptop computer or palm device 6. The customer may utilize the wireless network to access streaming audio or video content via laptop computer or palm device 6. Such applications may result in high amounts of broadcast/multicast messages being transmitted on the wireless network. If both associated with the same BSSID, handheld mobile terminal 4 would receive and process all broadcast/multicast messages associated with laptop or palm device 6—as a result, performance and battery life of handheld mobile terminal 4 would be adversely affected. However, in accordance with the present invention, AP 2 may be assigned 2 or more unique BSSIDs. A first BSSID may be a BSSID for use in connection with the retail establishment operations, and may support devices such as handheld mobile terminal 4 (i.e., a "private network"). A second BSSID may be allocated for customer use (e.g., a "public network"). Accordingly, performance and operation of the handheld mobile terminal 4 and retail establishment private network may be substantially improved.

Figure 2:
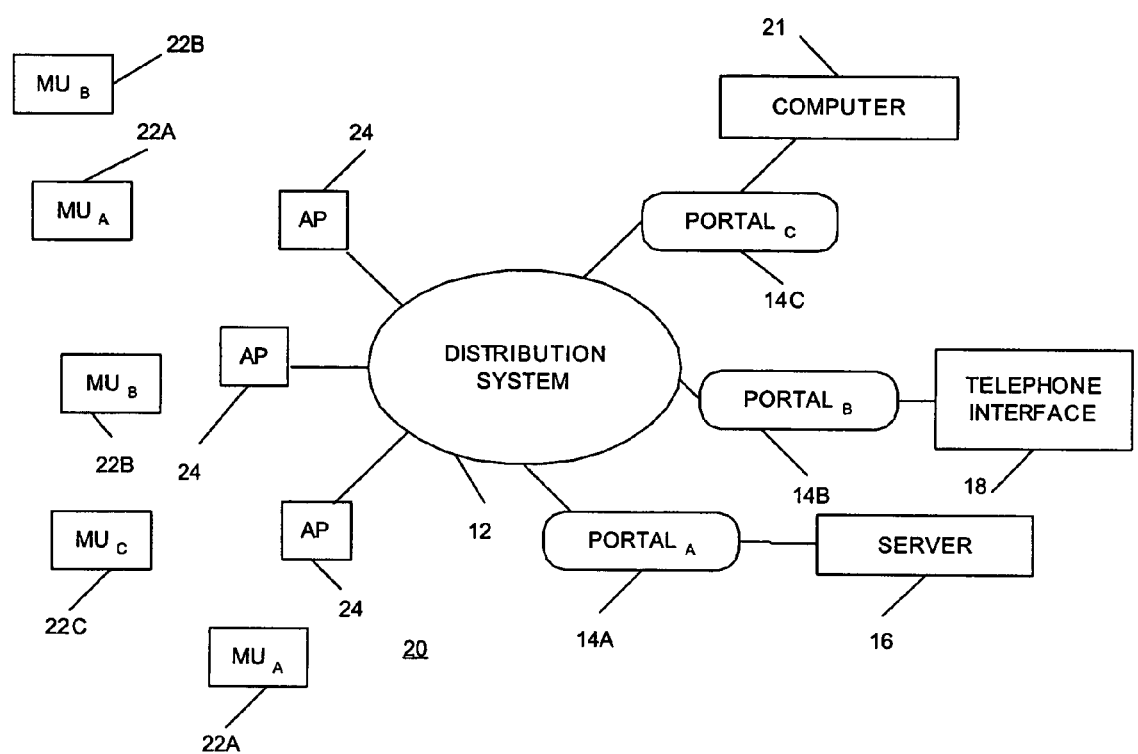
FIG. 2 is a block diagram of a virtual wireless network using a common distribution system in accordance with the present invention.

The present invention may also be implemented in conjunction with a system for virtual local area networks. Such an embodiment may include the use of several ESSIDs as assigned to each BSSID. Referring now to FIG. 2, there is shown a wireless network according to another embodiment of the present invention for providing data communication between local area networks, for example, a computer 21, a telephone interface 18 or a server 16, and mobile units 22. The system uses access points 24 to provide radio packet data communications with the mobile units 22 using a communications protocol, such as IEEE standard 802.11, whereby the radio modules in the mobile units 22 monitor polling signals from the access points 24 and associate with an access point 24 for purposes of data communications.

In accordance with a preferred embodiment of the present invention, an access point or access port may preferably be provided with a plurality of BSSIDs, and one or more of these BSSIDs may be assigned multiple ESSIDs.

In one exemplary arrangement the access point or access port preferably operates with four BSSIDs which are used by mobile units for association with the access point or access port. Virtual local area networks may each be assigned to an ESSID identity for purposes of communicating with mobile units.

Each ESSID is preferably assigned a BSSID for each access point with which it is to operate. In one example, an access point may be assigned 4 BSSIDs. 3 ESSIDs may be assigned to the first 3 unique BSSIDs, and the remaining ESSIDs may all be assigned to the last BSSID. In this arrangement the first three ESSIDs may preferably be associated with operations of the proprietor of the network, representing, for example, a security network, an operations network and an emergency network. Each network may operate under its own level of encryption and its own security scheme, even for broadcast or multicast messages using the unique BSSID. The remaining ESSIDs may preferably represent public networks with different levels of security and/or priority. These public networks preferably operate using a common BSSID and suffer the deficiency of having common messages such as broadcast and multicast messages transmitted in unencrypted form, or, alternatively, transmitted at the lowest level of encryption that is common to the virtual local area networks using the particular BSSID.

Using such an arrangement, in accordance with this exemplary embodiment of the present invention, the security scheme associated with an ESSID may be used by a BSSID. A network operator may thereby implement secure WLANs for private use and also simpler, less secure network environments for public or other network traffic. Additionally, a different security policy may be implemented for each ESSID, allowing for different security schemes for the various different VLANs. All ESSIDs assigned to a BSSID should preferably use the same security policy, since the messages transmitted over the BSSID will be transmitted according to the security policy of the lowest common denominator of the security policies of the ESSIDs.

Division of a network along VLAN or BSSID boundaries, in accordance with the present invention, may result in improved overall network performance. In accordance with the present invention, broadcast and multicast traffic may not be transmitted across an entire network infrastructure, but may preferably be limited to transmission to only those access points which correspond to a particular VLAN. Accordingly, the system and method of the present invention would result in less unnecessary network traffic, and thus better overall wireless network performance.

In the system of FIG. 2, each local area network, such as computer 21, telephone interface 18 or server 16 is associated with an ESSID assigned to the particular network and its mobile units. These local area networks are each coupled to distribution system 12 by a portal 14. In the distribution system 12, data messages from mobile units are routed to the appropriate portal using tags included in the messages, such as the tags specified by Standard 802.1.Q. The portal is arranged to receive messages from the distribution system and to relay messages having the associated tag to the local area network coupled to the portal.

The mobile units 22 may each preferably have an ESSID corresponding to the virtual local area network that the mobile units are intended to communicate with. A distinct ESSID may be associated with each virtual LAN such that data messages may be identified by ESSID in the wireless domain and by 802.1.Q tags in the wired distribution system.

In the arrangement of FIG. 2, as described in the co-pending application Ser. No. 10/773,931, each access point or access port operates with a BSSID, which is used in communications with associated mobile units. In accordance with the present invention, each ESSID may have its own security policy and these are likely different for different virtual local area networks. Since the access point or access port uses the same BSSID for communications associated with all networks, certain communications using the BSSID must be unencrypted, such as beacon signals and broadcast/multicast messages intended for all associated mobile units. This presents a security hazard.

Also in accordance with the present invention, a scheme for mapping wired network components to wireless network components may preferably be implemented in conjunction with packet forwarding functions. In a preferred embodiment of the present invention, a one-to-one mapping of ESSIDs to BSSIDs may be implemented. In this way, each BSSID will preferably operate under the security policy of its associated ESSID.

In another exemplary embodiment of the present invention, several ESSIDs may be assigned for each of one or more BSSIDs. Below is provided a chart illustrating an exemplary radio configuration for an access point in accordance with the present invention. The access point radio of this embodiment of the present invention preferably supports 4 BSSIDs and 16 ESSIDs.

| NIC/ | NIC/VLAN | ESSID | SECURITY | BSSID |
|---|---|---|---|---|
| 192.235.92.x/24 | 2/1000 | essid-0 | open | BSSID_1 |
| 192.235.92.x/24 | 2/1000 | essid-1 | wep-40 | BSSID_1 |
| 192.235.92.x/24 | 2/1000 | essid-2 | wep-128 | BSSID_1 |
| 192.235.92.x/24 | 2/1000 | essid-3 | tkip | BSSID_1 |
| 192.235.93.x/24 | 2/1001 | essid-4 | wep-40 | BSSID_2 |
| 192.235.94.x/24 | 2/1002 | essid-5 | wep-40 | BSSID_2 |
| 192.235.95.x/24 | 2/1003 | essid-6 | wep-40 | BSSID_2 |
| 192.235.96.x/24 | 2/1004 | essid-7 | wep-40 | BSSID_2 |
| 192.235.100.x/24 | 2/1008 | essid-8 | wep-128 | BSSID_3 |
| 192.235.101.x/24 | 2/1009 | essid-9 | wep-128 | BSSID_3 |
| 192.235.102.x/24 | 2/1010 | essid-10 | wep-128 | BSSID_3 |
| 192.235.103.x/24 | 2/1011 | essid-11 | wep-128 | BSSID_3 |
| 192.235.104.x/24 | 2/1012 | essid-12 | tkip | BSSID_4 |

-continued

| NIC/ | NIC/VLAN | ESSID | SECURITY | BSSID |
|---|---|---|---|---|
| 192.235.105.x/24 | 2/1013 | essid-13 | tkip | BSSID_4 |
| 192.235.106.x/24 | 2/1014 | essid-14 | tkip | BSSID_4 |
| 192.235.105.x/24 | 2/1015 | essid-15 | tkip | BSSID_4 |

The access point radio of this embodiment is shown to have 4 different BSSIDs—"BSSID_1" though "BSSID_4." Notably, each BSSID is associated with 4 ESSIDs—each of which may have a different security policy.

In such a scheme utilizing multiple BSSIDs and multiple ESSIDs per BSSID, allocation of BSSIDs may become a complex operation.

Also in accordance with this exemplary embodiment of the present invention, rules may be established for the automatic allocation of BSSIDs. For example, rules may preferably be established as follows:

When there is only 1 BSSID the BSSID is set to 1;
When the number of BSSIDs and ESSIDs is equal the system shall allocate the BSSID and ignore any external alterations;
When there are more ESSIDs than BSSIDs the system shall default to using unallocated BSSIDs until all have been used, and will then use the highest BSSID for any subsequent ESSIDs.

Under such an allocation scheme, it can be ensured that, for a multiple BSSID access point, at least one BSSID will have a single ESSID allocated to it, and it may thus operate according to the security policy of the ESSID. This ESSID and its associated VLAN may thus operate under higher security/priority than others. Also under this scheme, if there are more ESSIDs than BSSIDs, the last BSSID will have more than one ESSIDs allocated to it. For this last BSSID, broadcast and multicast messages may preferably be transmitted using the lowest security policy (a "least common denominator" method). This last BSSID would preferably correspond to a lower security and/or lower priority common network.

In accordance with an exemplary embodiment of the present invention, a scheme may be implemented for mapping a VLAN to an ESSID. Software may be used to map the WLANs (or ESSs) to a network interface card ("NIC") or a NIC/VLAN pair, in effect defining the Rest of Network ("RON") for a given ESSID.

The multiple BSSID/multiple ESSID case may also require further attention to determine to which mobile units a broadcast/multicast message from RON should be transmitted. Several alternative solutions may be implemented in accordance with various different embodiments of the present invention.

Broadcast distribution to the APs in the non-VLAN case will preferably be the same no matter where the broadcast originated (from mobile unit or from the Rest of Network). This implementation will preferably allow ESS-to-ESS communication as long as two ESSs are members of the same broadcast domain.

In another exemplary embodiment of the present invention, in the non-VLAN case, the BSSs to which broadcasts should be sent will be decided depending on the NIC that broadcasts was received on and which ESSs are associated with this NIC. Essentially, the decision will be exactly the same as in VLAN case, since each NIC may be assigned (in non-VLAN case) a special VLAN tag. Such a VLAN tag may be cross-referenced in a VLAN Hash Table to determine the appropriate target BSS for the particular message.

In case there are number of ESSs allocated to the same BSS but utilizing different security policies, the broadcast may preferably be encrypted using the lowest level of security on that BSS (the lowest common security denominator, or lowest security policy as between the different ESSIDs allocated to a given BSSID). This lowest common denominator encryption is determined by applying an algorithm to select encryption keys compatible with the security policy mapped to each ESSID on a BSSID. It is possible that the algorithm may result in no encryption. The is algorithm is preferably applied to each of the 4 possible BSSIDs on an access point/access port. Thus an access point/access port will preferably provide broadcast/multicast encryption keys as determined by this algorithm for each of its 4 BSSIDs.

It is noted that the present invention is not limited in scope to any particular type of 802.11 network or version of the IEEE 802.11 standard. The present invention may be used with 802.11a networks, 802.11b networks, 802.11g networks, other types of 802.11 networks, or any other computer networks, wireless or wired, which use service set identifications.

While there have been described what are believed to be the preferred embodiments of the present invention, those skilled in the art will recognize that other and further changes and modifications may be made thereto without departing from the spirit of the invention, and it is intended to claim all such changes and modifications as falls in the scope of the invention.

We claim:

1. A method for operating a wireless local area network comprising:
    assigning a plurality of basic service set identifiers to at least one access point;
        wherein the basic service set identifiers are simultaneously available to devices on the network, to enable the at least one of the access points to associate with and manage the at least one of the devices configured with one of the associated basic service set identifiers.

2. The method of claim 1 wherein said wireless local area network operates according to an 802.11 protocol.

3. A method for operating a wireless local area network to provide communications with a plurality of virtual local area networks, comprising: assigning a plurality of basic service set identifiers to at least some access points; mapping an extended service set identifier to each virtual local area network; and assigning each of said extended service set identifiers and associated local area networks to one of said basic service set identifiers, said assignment being arranged to provide a single extended service set identifier for at least some of said basic service set identifiers.

4. A method as specified in claim 3 wherein said wireless local area network includes security arrangements, said security arrangements being associated with at least one of said virtual local area networks and associated extended service set identifier, and wherein communications using basic service set identifiers having a single extended service set identifier use security arrangements associated with said extended service set identifier.

5. A method as specified in claim 3 wherein at least some access points are assigned four basic service set identifiers and wherein no more than one extended service set identifier is assigned to three of said basic service set identifiers and wherein any additional extended service set identifiers are assigned to the remaining basic service set identifier.

6. A method as specified in claim 3 wherein at least some access points are assigned more than four basic service set identifiers and wherein no more than one extended service set identifier is assigned to three of said basic service set identifiers and wherein any additional extended service set identifiers are assigned to the remaining basic service set identifier.

7. A method for operating a wireless local area network, comprising:

assigning a plurality of basic service set identifiers to at least one access point;

associating one of said plurality of basic service set identifiers with a mobile unit;

operating said mobile unit in a power-save mode; and waking said mobile unit from said power-save mode when said mobile unit receives a message which includes said associated basic service set identifier;

wherein the basic service set identifiers are simultaneously available to devices on the network.

8. The method of claim 7 wherein said wireless local area network operates according to an 802.11 protocol.

* * * * *